US011403832B2

(12) United States Patent
Lei et al.

(10) Patent No.: US 11,403,832 B2
(45) Date of Patent: Aug. 2, 2022

(54) MODELING ROTATING OBJECTS (71) Applicant: Hewlett-Packard Development Company, L.P., Spring, TX (US)

(72) Inventors: Yang Lei, Palo Alto, CA (US); Viktor Shkolnikov, Palo Alto, CA (US); Daixi Xin, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/256,353

(22) PCT Filed: Oct. 3, 2018

(86) PCT No.: PCT/US2018/054089
§ 371 (c)(1),
(2) Date: Dec. 28, 2020

(87) PCT Pub. No.: WO2020/072045
PCT Pub. Date: Apr. 9, 2020

(65) Prior Publication Data
US 2021/0264687 A1 Aug. 26, 2021

(51) Int. Cl.
*G06T 19/20* (2011.01)
*G06T 7/564* (2017.01)
(Continued)

(52) U.S. Cl.
CPC .............. *G06T 19/20* (2013.01); *G06T 7/564* (2017.01); *G06T 17/10* (2013.01); *G06T 2207/10056* (2013.01); *G06T 2219/2016* (2013.01)

(58) Field of Classification Search
CPC ......... G06T 17/00; G06T 17/10; G06T 19/20; G06T 2207/10016; G06T 2207/10056;
(Continued)

(56) References Cited

U.S. PATENT DOCUMENTS 6,563,499 B1    5/2003  Waupotitsch et al.
8,143,600 B2    3/2012  Seibel et al.
(Continued)

FOREIGN PATENT DOCUMENTS

WO    WO-2017151978 A1    9/2017

OTHER PUBLICATIONS

Cárdenes, et al., "3D membrane segmentation and quantification of intact thick cells using cryo soft X-ray transmission microscopy: A pilot study", Plos one 12, No. 4 (2017), 22 pgs.
(Continued)

*Primary Examiner* — Sing-Wai Wu
(74) *Attorney, Agent, or Firm* — Amin Turocy & Watson LLP (57) ABSTRACT

An example method includes capturing a plurality of images of a rotating object using an imaging device optically coupled to a microscope. The method removing a first portion of a model of the rotating object based on a first contour of the rotating object in a first image of the plurality of images. The method includes orienting the model based on an amount of rotation of the rotating object between capture of the first image and capture of a second image of the plurality of images. The method also includes removing a second portion of the model of the rotating object based on a second contour of the rotating object in the second image.

15 Claims, 6 Drawing Sheets

(51) Int. Cl.
*G06T 17/10* (2006.01)
*G06T 17/00* (2006.01)

(58) Field of Classification Search
CPC . G06T 2207/10061; G06T 2207/30024; G06T 2219/2016; G06T 7/564
See application file for complete search history.

(56) References Cited

U.S. PATENT DOCUMENTS

| | | |
|---|---|---|
| 2002/0033821 A1* | 3/2002 | Sfarti ................... G06T 17/30 345/423 |
| 2002/0050988 A1 | 5/2002 | Petrov et al. |
| 2005/0085721 A1 | 4/2005 | Fauver et al. |
| 2005/0157312 A1 | 7/2005 | Bachim et al. |
| 2012/0105600 A1 | 5/2012 | Meyer et al. |
| 2012/0196320 A1 | 8/2012 | Seibel et al. |
| 2017/0116776 A1 | 4/2017 | Aughey |
| 2018/0149846 A1* | 5/2018 | Yin ...................... G01B 21/042 |

OTHER PUBLICATIONS

Fauver, et al., "Three-dimensional imaging of single isolated cell nuclei using optical projection tomography", Optics express 13, No. 11 (2005): 4210-4223.

Kang, et al., "Tracking epithelial cell junctions in C. elegans embryogenesis with active contours guided by SIFT flow", IEEE Transactions on Biomedical Engineering 62, No. 4 (2014): 1020-1033.

* cited by examiner

Capture a Plurality of Images of a Rotating Object
302

Remove a First Portion of a Model of the Rotating Object Based on a First Contour in a First Image
304

Orient the Model Based on an Amount of Rotation of the Rotating Object
306

Remove a Second Portion of a Model of the Rotating Object Based on a Second Contour in a Second Image
308

MODELING ROTATING OBJECTS

BACKGROUND

A microscope may magnify the appearance of a small object, such as a cell, a cellular particle, or the like. The microscope may be an optical microscope that includes optical elements, such as mirrors, lenses, or the like to magnify the appearance of the small object. A user may place the small object in front of a lens, such as an objective lens, and a magnified version of the small object may then be visible through an eyepiece. An imaging device may be connected to the eyepiece or an optical train of the microscope to capture magnified images of the small object.

DETAILED DESCRIPTION

A user may wish to generate a three-dimensional model of an object being imaged through a microscope from two-dimensional images captured by an imaging device. Three-dimensional models may be used for basic cell study, to track spatial localization of activities in a cell (e.g., localization of proteins in a cell, etc.), or the like. Accordingly, in an example, a user may use confocal microscopy to image an object and generate a three-dimensional model based on the imaging of the object. For example, the user may include a pinhole aperture in the optical train to block out-of-focus light from being received by an imaging device. The imaging device may thus capture an image of an in-focus section of the object without capturing in the image light from out-of-focus sections of the object. The focus of the microscope may be adjusted to capture additional images of additional sections of the object (e.g., by stepping predetermined distances between imaging) until the entire object has been imaged. The three-dimensional model may be generated by stacking relevant portions of the images of the sections.

There are a number of drawbacks to using confocal microscopy to generate the three-dimensional model. A confocal microscopy system may be expensive due to the cost of the stepper, confocal optics, imaging device, etc. The images may be degraded due to the light from the section being imaged passing through other portions of the object before reaching the imaging device, which may filter the light, add noise, or the like. The pinhole aperture blocks much of the light illuminating the object from reaching the imaging device. Accordingly, the user may be subject to trade-offs between exposure time and signal-to-noise ratio.

The user may choose between having a short exposure and a poor signal-to-noise ratio or having a good signal-to-noise ratio and a long exposure. Moreover, the resolution along an axis parallel to a normal vector of the image plane may depend on the number of images captured. The user may capture numerous images to reach a desired resolution, which may be time consuming. Accordingly, generation of three-dimensional models of objects could be improved by being able to use an inexpensive system to quickly capture a sufficient number of images to generate the model while maintaining a good signal-to-noise ratio and resolution.

Figure 1:
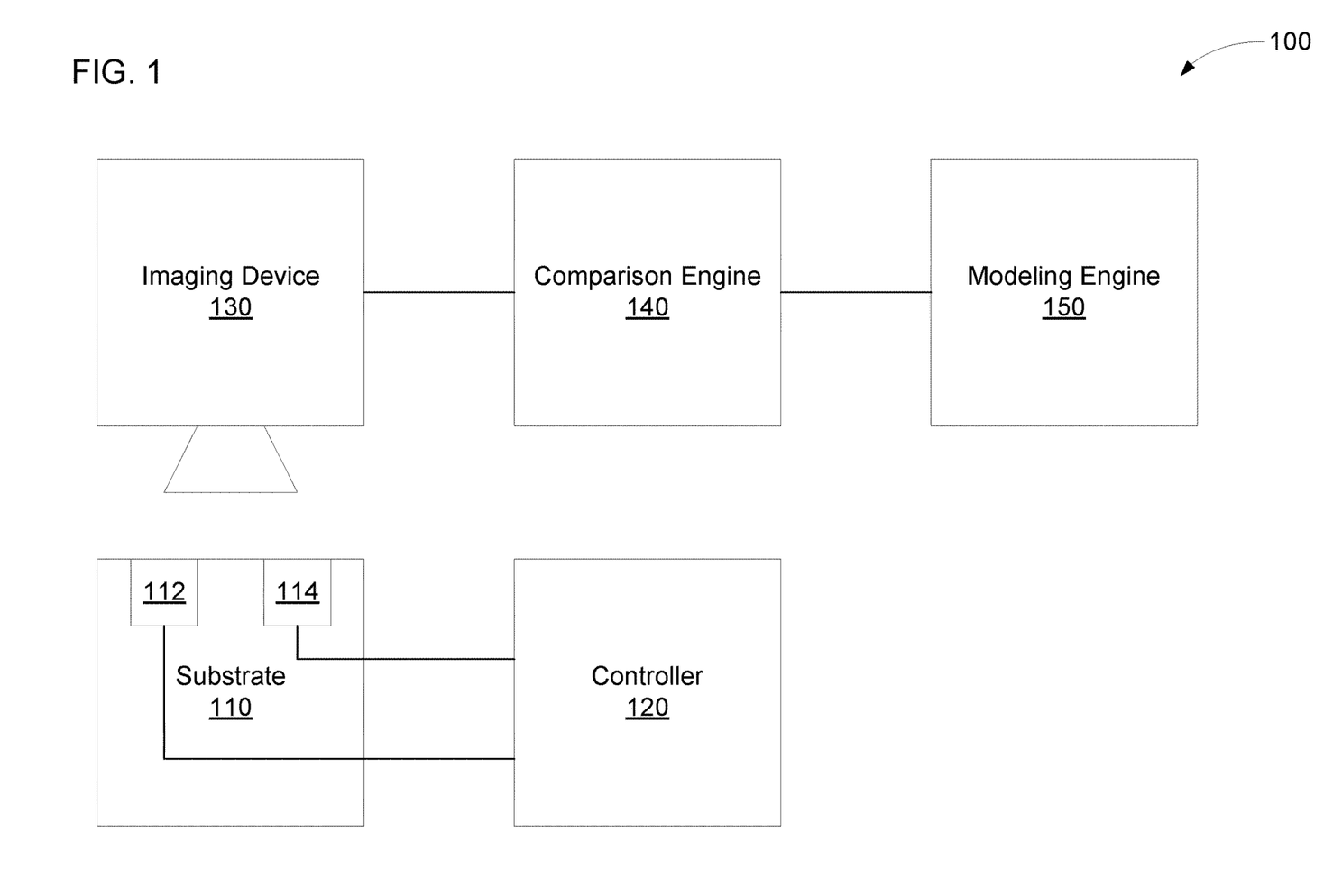
FIG. 1 is a block diagram of an example system to generate a model of an object from images of the object.

FIG. 1 is a block diagram of an example system 100 to generate a model of an object from images of the object. The system 100 may include a substrate 110, and the substrate 110 may include a plurality of electrodes 112, 114. The substrate 110 may be able to receive a fluid, and the fluid may include an object suspended in the fluid, such as the object to be modeled. The object may be a cell (e.g., a cell membrane), a cell particle (e.g., a portion of the cell, such as a nucleus, a lysosome, etc.), or the like. The system 100 may also include a controller 120. The controller 120 may be electrically coupled to the plurality of electrodes 112, 114.

As used herein, the term "controller" or "engine" refers to hardware (e.g., analog or digital circuitry, a processor, such as an integrated circuit, or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random-access memory (RAM), a hard-disk or solid-state drive, resistive memory, or optical media such as a digital versatile disc (DVD), and/or executed or interpreted by a processor), or hardware and software hosted at hardware.

The controller 120 may apply a voltage to the plurality of electrodes to create an electric field to rotate the object suspended in the fluid. For example, the controller 120 may apply a voltage that creates an electric field that results in a dielectrophoretic force on the object that causes rotation of the object. The electric field may cause the object to rotate about an axis lying within the image plane. In an example, the controller 120 and electrodes 112, 114 may create a rotating electric field that cause rotation of the object. The system 100 may include an imaging device 130. The imaging device 130 may capture a plurality of images of the object while the object is rotating. As the object rotates, the imaging device 130 may capture images of the object at various orientations due to the rotation of the object during the image capturing.

The system 100 may include a comparison engine 140. The comparison engine 140 may determine a spatial relationship between the imaging device and the object for each image. The comparison engine 140 may use either the imaging device's frame of reference, in which the object is rotating, or the object's frame of reference, in which the imaging device is revolving around the object, when determining the spatial relationship between the imaging device and the object. The comparison engine 140 may compare a projection of a model of the object to a respective contour of the object in each image. The comparison engine 140 may project the model onto a plane, such as by backprojecting the model onto the plane to allow the contour in an image to be compared to the projection of the model. The comparison engine 140 may select an orientation of the projection corresponding to the spatial relationship between the imaging device and the object. For example, the comparison engine 140 may rotate the model or select a projection direction so that the projection direction relative to the model corresponds to the direction of the image device relative to the object.

The system 100 may include a modeling engine 150. The modeling engine 150 may modify the model of the object to more closely correspond to the respective contour of the object in each image. For example, based on the comparisons by the comparison engine 140, the modeling engine 150 may determine where the model is inconsistent with the object. The modeling engine 150 may adjust the model to reduce or remove the inconsistency with the object.

Figure 2:
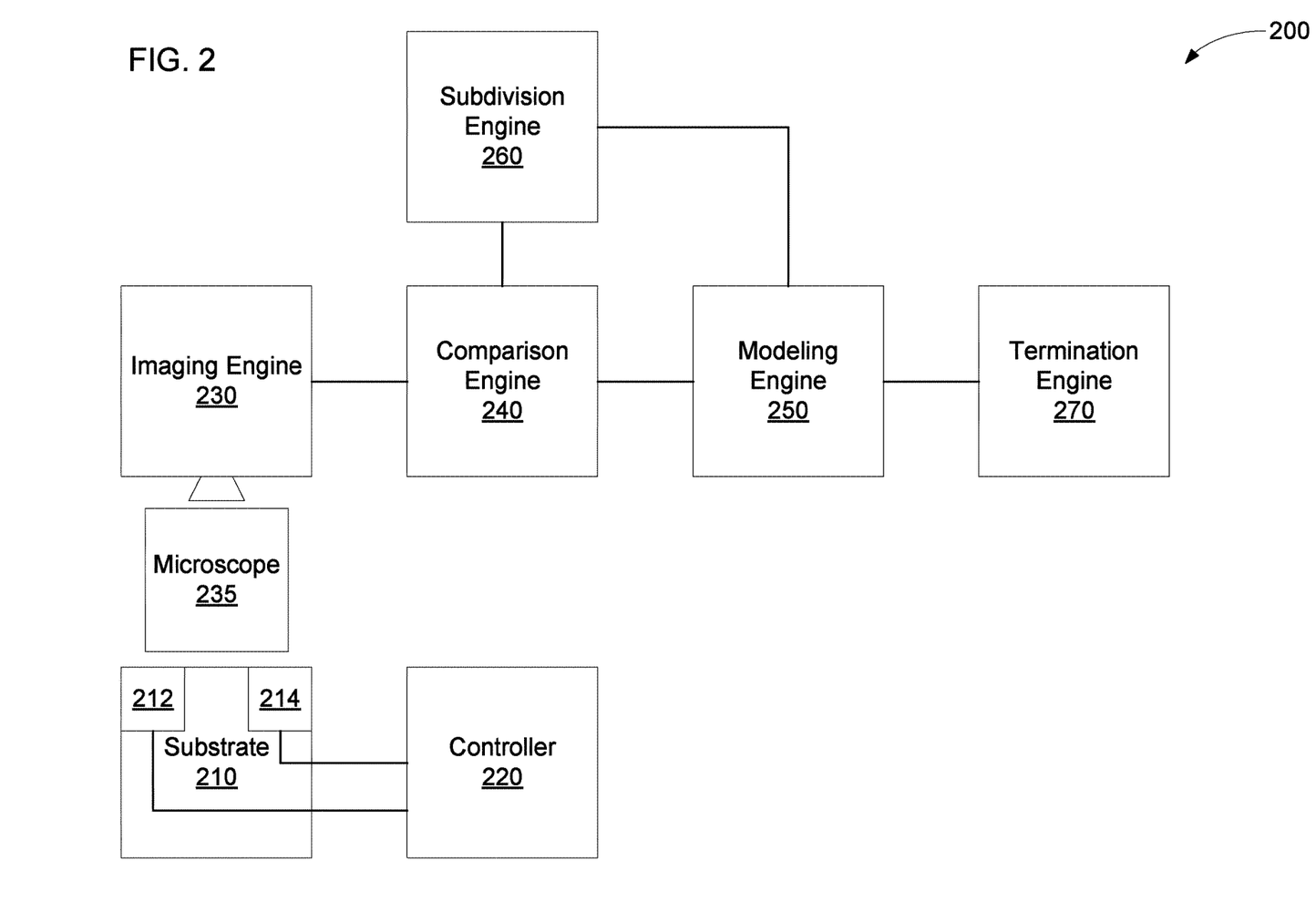
FIG. 2 is a block diagram of another example system to generate a model of an object from images of the object.

FIG. 2 is a block diagram of another example system 200 to generate a model of an object from images of the object. The system 200 may include a substrate 210. The substrate 210 may be able to hold a fluid in which an object is suspended. For example, the substrate 210 may include wells, walls, or the like to retain the fluid on the substrate. A user may deliver the fluid containing the object to be modeled to the substrate. In the illustrated example, the substrate 210 includes a plurality of electrodes 212, 214 that enable rotation of the object. The electrodes 212, 214 may be parallel lines, concentric circles, or the like at or below a surface of the substrate 210 on which the fluid is situated. In some examples, the substrate 210 may not include the electrodes 212, 214, and a magnetic field, a thermal field, a liquid flow, or the like may be used to rotate the object.

In the illustrated example, the system 200 includes a controller 220. The controller 220 may apply a voltage to the plurality of electrodes to create an electric field to rotate the object suspended in the fluid. In an example, the controller 220 may apply a voltage to the electrodes 212, 214 to create a rotating electric field to rotate the object. In some examples, the controller 220 may apply a voltage to the electrodes 212, 214 to create a nonrotating electric field to rotate the object, such as an electric field that creates a dielectrophoretic force on the object (e.g., a nonuniform electric field). The electrodes 212, 214 may be sized, shaped, or positioned to enable the creation of an electric field that provides a rotational force (e.g., a rotating electric field, a nonuniform electric field, etc.). The controller 220 may apply an alternating current (AC) voltage to the electrodes 212, 214 to create the electric field. In some examples, the AC voltage may have a frequency between 30 kilohertz (kHz) and 500 kHz or a root mean square voltage between 0.1 volts (V) and 100 V. In some examples, the voltage or frequency may be selected to rotate the object at a particular rate. For example, a user may choose a desired rate of rotation and select the voltage or frequency accordingly.

The system 200 may include an imaging device 230. The imagining device 230 may capture a plurality of images of the object. The system 200 may also include a microscope 235, which may be optically coupled to the imaging device 230. The object may be microscopic, and the microscope 235 may magnify the object to allow the imaging device 230 to capture images of the object with a high resolution. As used herein, the term "microscope" refers to a device that magnifies an object difficult to discern with an unaided eye. The microscope may be an optical microscope, a stereoscope, a microscope that creates an image based on a physical property (e.g., an electron microscope, an atomic force microscope, etc.), or the like. The object may be within a field of view of the microscope 235, which may direct optical energy received from the object to the imaging device 230 to use to create the plurality of images. The imaging device 230 and microscope 235 may image the device using transmitted light microscopy, reflected light microscopy, fluorescence microscopy, super-resolution microscopy, or the like. A magnification of the microscope or imaging device aperture may be selected so that the resulting depth of field is at least substantially a depth of the object. As a result, the entire depth of the object may be in focus when imaged. As used herein, the terms "substantially" or "about" refers to a value that differs by at most a particular percentage of a nominal value. The particular percentage may be 1%, 2%, 5%, 10%, 20%, etc.

As the object is rotated, e.g., by the controller 220 and electrodes 212, 214, the imaging device 230 may capture the plurality of images of the object at various orientations. The frame rate of the imaging device may be selected based on the rate of rotation of the object, or the rate of rotation may be selected based on the frame rate of the imaging device. For example, the frame rate of the imaging device or the rate of rotation may be a limiting factor for how quickly the plurality of images can be captured. Accordingly, the non-limiting factor may be adjusted to have a rate corresponding to the rate of the limiting factor.

The frame rate or rate of rotation may be selected so that the object is at different orientations in the plurality of images. In an example, the plurality of images may include at least two images in which the object has different orientations. The plurality of images may be taken during a single rotation of the object or during multiple rotations. For example, in one set of examples, the rotation of the object between temporally-adjacent images may be about one degree, two degrees, five degrees, 10 degrees, 12 degrees, 20 degrees, 36 degrees, etc. However, in another set of examples, the plurality of image may be taken during multiple rotations of the object (e.g., a rotation of the object between temporally-adjacent images of about 102 degrees, 190 degrees, 362 degrees, 740 degrees, 912 degrees, or the like). The object may perform a full rotation or multiple full rotations between temporally-adjacent images, or there may be multiple images per rotation with a complete set of images being captured after multiple rotations.

In some examples, the object may be partially or wholly transparent or translucent, and an object rotated 180 degrees may appear in an image to be a reflection of the object at 0 degrees of rotation in another image. Accordingly, in an example, the plurality of images may be captured at rotations of less than or no more than 180 degrees. In an example, 180 degrees may not be divisible by the amount of rotation between images so that the images taken between 0 and 180 degrees may not be reflections of the images taken between 180 and 360 degrees. In some examples, multiple models of the object may be generated, for example, to show changes to the object over time (e.g., in a two-dimensional or three-dimensional video of the object). A first model may be generated based on images taken between 0 and 180 degrees of rotation, a second model may be generated based on images taken between 180 degrees and 360 degrees of rotation, and so on. In an example, the first model may be generated based on images taken between 0 and 360 degrees of rotation, a second model may be generated based on images taken between 360 and 720 degrees of rotation, and so on.

The system 200 may include a comparison engine 240. The comparison engine 240 may determine a spatial relationship between the imaging device 230 and the object for each image. The rate of rotation of the object may be measured, may be calculated based on assumptions, may be set based on the choice of voltage or frequency or the like. The comparison engine 240 may determine how much the object has rotated between images based on the rate of rotation and the frame rate (e.g., by dividing the rate of rotation by the frame rate). The comparison engine 240 may determine the spatial relationship from the frame of reference of the image device 230 (e.g., the amount of rotation of the object) or from the frame of reference of the object (e.g., the amount of revolution about the object by the image device 230).

The comparison engine 240 may compare a projection of a model of the object to a respective contour of the object in each image. For example, for each image, the comparison engine 240 may backproject the model onto the image plane of that image. The comparison engine 240 may perform the backprojection at an orientation corresponding to the spatial relationship determined for that image. For example, the comparison engine 240 may rotate the model prior to projection, or the comparison engine 240 may choose a direction to backproject from the model based on the spatial relationship. The comparison engine 240 may extract the contour from each image. For example, a user may select an object, and the comparison engine 240 may determine the contour for that object (e.g., using computer visions techniques, machine learning, etc.). In some examples, the system 200 may generate models for multiple objects (e.g., a cell and a cell particles, multiple cell particles, multiple cells, or the like). The comparison engine 240 may extract the contours for the multiple objects and compare them to the corresponding models for each object.

The system 200 may include a modeling engine 250. The modeling engine 250 may modify the model of the object to more closely correspond to the respective contour of the object in each image. In an example, the comparison engine 240 and the modeling engine 250 may modify the model iteratively to correspond to the object as determined based on the contours. For example, the modeling engine 250 may initially form the model of the object as a volume element (voxel). The voxel may be a three-dimensional solid, a polyhedron, a cube, or the like. The system 200 may include a subdivision engine 260. The subdivision engine 260 may subdivide the voxel into smaller voxels. For example, a cube may be subdivided into eight smaller cubes. In some examples, the voxel may be subdivided multiple times in each iteration (e.g., a cube subdivided into 8^2 (64), 8^3 (512) smaller cubes, or the like).

The comparison engine 240 may backproject the vertices of the voxels onto the image plane of an image for comparison with the contour for that image. The comparison engine 240 may determine for each of the subdivided voxels whether a contour lies within the projection of that subdivided voxel or whether a subdivided voxel is entirely inside or outside the contour. The modeling engine 250 may remove subdivided voxels to cause the model of the object to more closely correspond to the object (e.g., more closely correspond to the contour of the object in each image). In an example, the modeling engine 250 may remove from the model a subdivided voxel that is entirely outside the contour in any image. A subdivided voxel that is entirely inside the contour in every image may correspond to an interior of the object. The modeling engine 250 may remove from the model subdivided voxels that are entirely inside the contour in every image. Accordingly, the modified model may include a subset of the subdivided voxels that correspond to a boundary of the object (e.g., subdivided voxels intersected by a contour but not entirely outside the object).

The system 200 may include a termination engine 270. The termination engine 270 may determine whether to perform an additional iteration or to terminate the iterative process. For example, the termination engine 270 may compare a smallest subdivided voxel to a resolution threshold to determine whether to perform an additional iteration. The resolution threshold may be user specified, may depend on the resolution attainable by the imaging device, may depend on an application or use for the model, or the like. Based on a determination to perform an additional iteration, the subdivision engine 260 may further subdivide the subdivided voxels remaining in the model. The comparison engine 240 may compare backprojections of the further subdivided voxels (e.g., a backprojection of the vertices) with the contours in each image. The modeling engine 270 may remove further subdivided voxels according to similar criteria as used for the subdivided voxels.

Additional iterations may be performed until the termination engine 270 determines not to perform an additional iteration, for example, based on a resolution threshold being reached, based on a predetermined number of iterations being performed, or the like. The termination engine 270 may output a final model after the final iteration. In an example, the termination engine 270 may generate the final model by generating a representation of a surface of the object based on the model after final iteration. For example, the termination engine 270 may generate a mesh or solid by connecting vertices of the final voxels (e.g., vertices on an external side of the voxels of the model after the final iteration).

In some examples, the model may be modified non-iteratively to produce the final version. The subdivision engine 260 may subdivide the initial voxel until it has subdivided voxels below the resolution threshold, has subdivided a predetermined number of times, or the like. The comparison engine 240 and modeling engine 250 may operate as previously discussed to remove the subdivided voxels in a single iteration, and the result may be finalized or output. In an example, the comparison engine 240 and the modeling engine 250 may compare and modify the model without subdividing voxels. The modeling engine 250 may modify the shape of the model until the model matches the contour for that direction. For example, the comparison engine 240 may extend the contour into three dimensions in a direction of the normal vector of the image plane. The modeling engine 250 may modify the model (e.g., a surface of the model) so that any portions of the model outside the extended contour are modified to conform to the extended contour (e.g., by redefining the surface of the model). The comparison engine 240 and the modeling engine 250 may extend the contour and modify the model based on that contour for each image in the plurality to produce a result to be finalized or output.

Thus, the system 200 may have several advantages. The system 200 may quickly generate three-dimensional models of objects with high resolution and signal-to-noise ratio. The system 200 may be less expensive than a confocal microscope system. The system 200 may generate models of multiple objects (e.g., multiple cells, multiple cell particles, a cell and a cell particle, or the like) from the same plurality of images.

Figure 3:
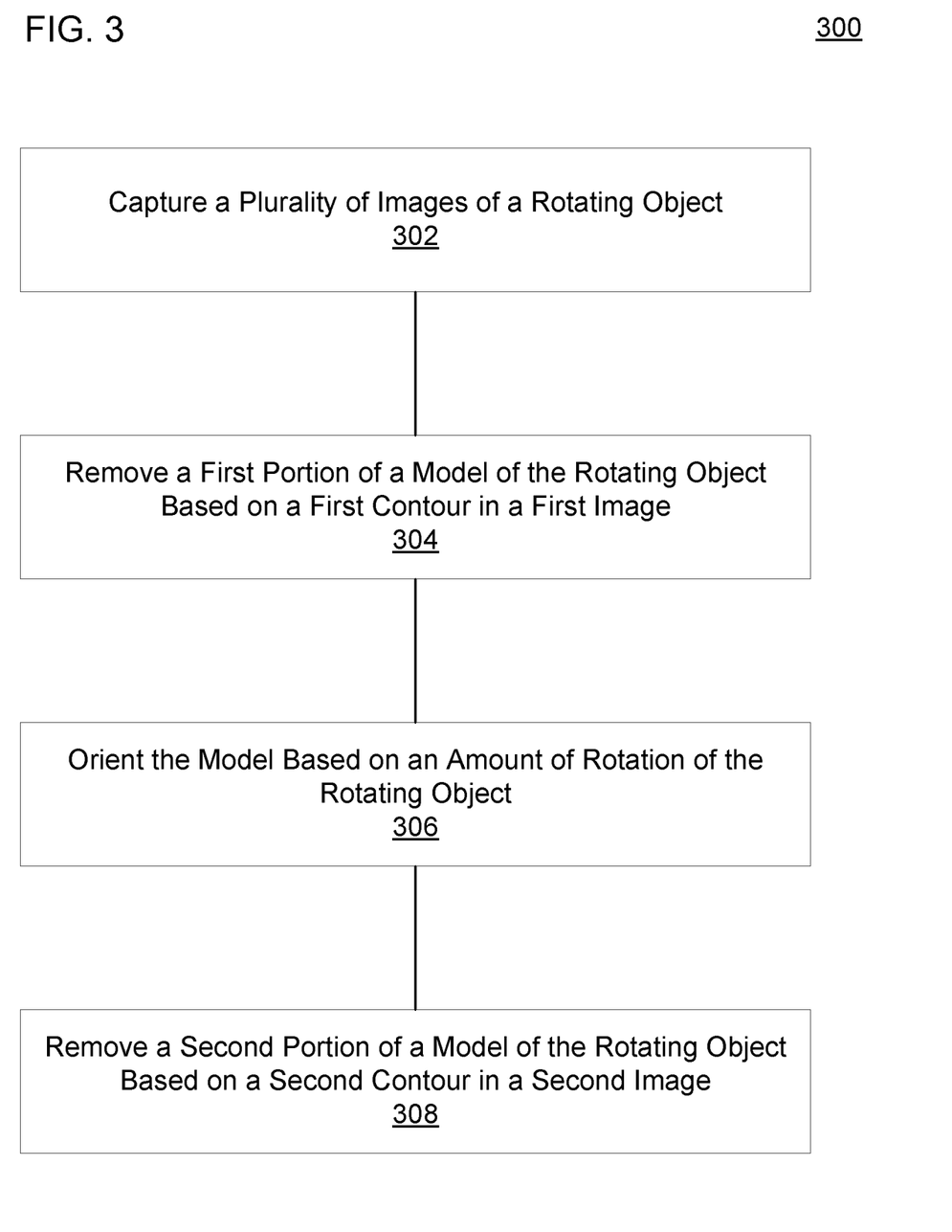
FIG. 3 is a flow diagram of an example method to generate a model of an object from images of the object.

FIG. 3 is a flow diagram of an example method 300 to generate a model of an object from images of the object. A processor may perform elements of the method 300. At block 302, the method 300 may include capturing a plurality of images of a rotating object using an imaging device optically coupled to a microscope. The images may be captured over time, and the object may rotate into different orientations between images.

Block 304 may include removing a first portion of a model of the rotating object based on a first contour of the rotating object in a first image of the plurality of images. For example, the first portion to be removed may be determined based on the first contour. The first portion may be a portion outside the first contour or a portion inside the first contour. At block 306, the method 300 may include orienting the model based on an amount of rotation of the rotating object between capture of the first image and capture of a second image of the plurality of images. Orienting the model may include rotating the model, determining a location of an image plane relative to the model, selecting a projection direction based on the amount of rotation of the rotating object, or the like.

Block 308 may include removing a second portion of the model of the rotating object based on a second contour of the rotating object in the second image. For example, the second portion to be removed may be determined based on the second contour. In some examples, the first and second portions to be removed may both be determined before either is actually removed from the model. In an example, the first portion may be removed from the model prior to determination of the second portion to be removed. Referring to FIG. 1, in an example, the imaging device 130 may perform block 302, the comparison engine 140 may perform block 304, 306, or 308, and the modeling engine 150 may perform block 304 or 308.

Figure 4:
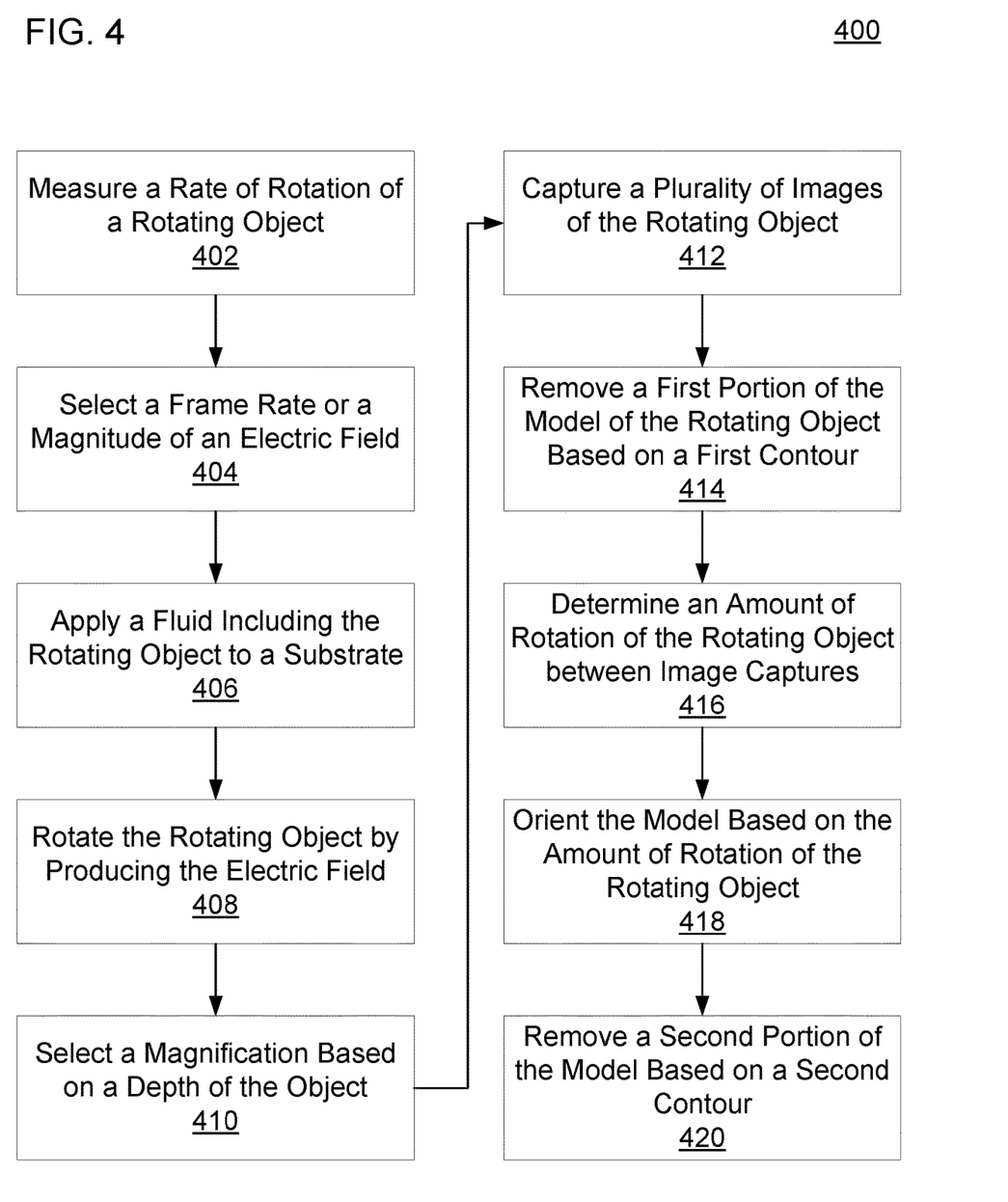
FIG. 4 is a flow diagram of another example method to generate a model of an object from images of the object.

FIG. 4 is a flow diagram of another example method 400 to generate a model of an object from images of the object. A processor may perform elements of the method 400. At block 402, the method 400 may include measuring a rate of rotation of a rotating object. In an example, the object may be subjected to rotational forces of various magnitudes, such as electric field induced by signals with various voltages or frequencies. The rate of rotation may be measured to determine how the choice of parameters related to application of the rotational force affect the rate of rotation (e.g., to allow parameters to be chosen to produce a desired rate of rotation). In some examples, a set of parameters related to application of the rotational force may be chosen, and the rate of rotation may be measured and stored for use during later elements of the method 400.

Block 404 may include selecting a frame rate of an imaging device based on a rate of rotation of a rotating object or selecting a magnitude of a nonrotating, nonuniform electric field to cause a rate of rotation selected based on a frame rate of the imaging device. For example, based on the rate of rotation, the frame rate may be selected to result in a desired amount of rotation of the rotating object between captured images. In some examples, the frame rate may be fixed or set to a predetermined value, and the magnitude of an electric field to rotate the rotating object may be selected based on that frame rate. In some examples, the electric field may be a nonrotating, nonuniform electric field that causes rotation of the rotating object. The magnitude of the electric field, such as the voltage applied to electrodes to induce the electric field, a frequency of the applied voltage, or the like, may be selected based on a desired rate of rotation of the rotating object. The desired rate of rotation may be selected based on the frame rate, for example, to produce a desired amount of rotation of the rotating object between captured images. The relationship between frequency or voltage and rate of rotation may be determined from the measurements at block 402, may be calculated based on assumptions about the rotating object, or the like. In an example, the frame rate or voltage or frequency of the electric field may be selected without regard to the rate of rotation of the rotating object.

At block 406, the method 400 may include applying a fluid in which the rotating object is suspended to a substrate. For example, the rotating object may be mixed with the fluid or may have been previously stored in the fluid. The fluid may be applied to the substrate by pipetting, jetting, or the like. The rotating object may not be rotating initially when it is suspended in the fluid or applied to the substrate. Block 408 may include rotating the rotating object by producing a nonrotating, nonuniform electric field using a plurality of electrodes on the substrate. As previously discussed, other fields or forces may also or instead be applied to the rotating object to cause the rotation. Producing the nonrotating, nonuniform electric field may include applying an AC voltage to a plurality of electrodes in or on the substrate (e.g., electrodes beneath the fluid). The voltage or frequency of the AC voltage may be selected at block 404, may be predetermined, or the like. In some examples, measuring the rate of rotation at block 402 may be performed after block 408, such as when the voltage or frequency of the AC voltage are not selected to produce a predetermined or design rate of rotation.

At block 410, the method 400 may include selecting a magnification for a microscope. The magnification may be selected so that the rotating object can be imaged with a depth of field that is at least substantially a depth of the object. For example, higher magnifications may result in smaller depths of field, so the highest magnification that results in an acceptable depth of field may be used. The microscope may be adjusted to have the selected magnification, and the substrate and rotating object may be positioned beneath an objective lens of the microscope at a location that allows the rotating object to be imaged by the imaging device through the microscope.

Block 412 may include capturing a plurality of images of the rotating object using the imaging device, which may be optically coupled to the microscope. For the imaging device may be instructed to capture a plurality of images, may be triggered at periodic intervals to capture the plurality of images, or the like. At block 414, the method 400 may include removing a first portion of a model of the rotating object based on a first contour of the rotating object in a first image of the plurality of images. For example, removing the first portion may include determining the first portion to be removed, or removing the determined first portion. In an example, determining the first portion to be removed may include determining a first voxel to be removed.

Block 416 may include determining the amount of rotation of the rotating object between capture of the first image and capture of a second image of the plurality of images based on the rate of rotation. The rate of rotation may have been measured at block 408, may have been calculated (e.g., based on characteristics of the object, characteristics of the force or field causing rotation, the voltage or frequency applied to an electrode to create an electric field, etc.), may have been set by choosing parameters related to generation of a force or field causing rotation (e.g., the voltage or frequency applied to an electrode to create an electric field, a magnitude of a field or force causing rotation, etc.), or the like. The amount of rotation may be determined based on the rate of rotation and the timing of the first and second images (e.g., the frame rate, the time between capturing of the first and second images, or the like).

Block 418 may include orienting the model based on the amount of rotation of the rotating object between capture of the first image and capture of the second image. Orienting the model may include rotating the model, determining a location of an image plane relative to the model, selecting a projection direction based on the amount of rotation of the rotating object, or the like. For example, the model may be rotated the same amount the object rotated, or the image plane or projection direction may have rotated the same amount as the object but in an opposite direction when the model is stationary.

Block 420 may include removing a second portion of the model of the rotating object based on a second contour of the rotating object in the second image. As with block 414, removing the second portion may include determining the second portion to be removed, and removing the determined second portion. Determining the second portion to be removed may include determining a second voxel to be removed. In an example, both the first portion and the second portion may be determined before either portion is removed. For example, each contour may be compared to the model to determine which portions to remove. In some examples, the comparisons of multiple contours to the model may be used to determine whether a particular portion (e.g., a particular voxel) can be removed. In some examples, the first portion may be removed before the second portion is determined. In some examples, blocks of the method 400 may be repeated to iteratively remove portions of the model. In an example, the comparison engine 240 of FIG. 2 may perform block 402, 404, 414, 416, 418, or 420, the controller 220 may perform block 404 or 408, a user may perform block 406 or 410, the imaging device 230 may perform block 404 or 412, or the modeling engine 250 may perform block 414 or 420.

Figure 5:
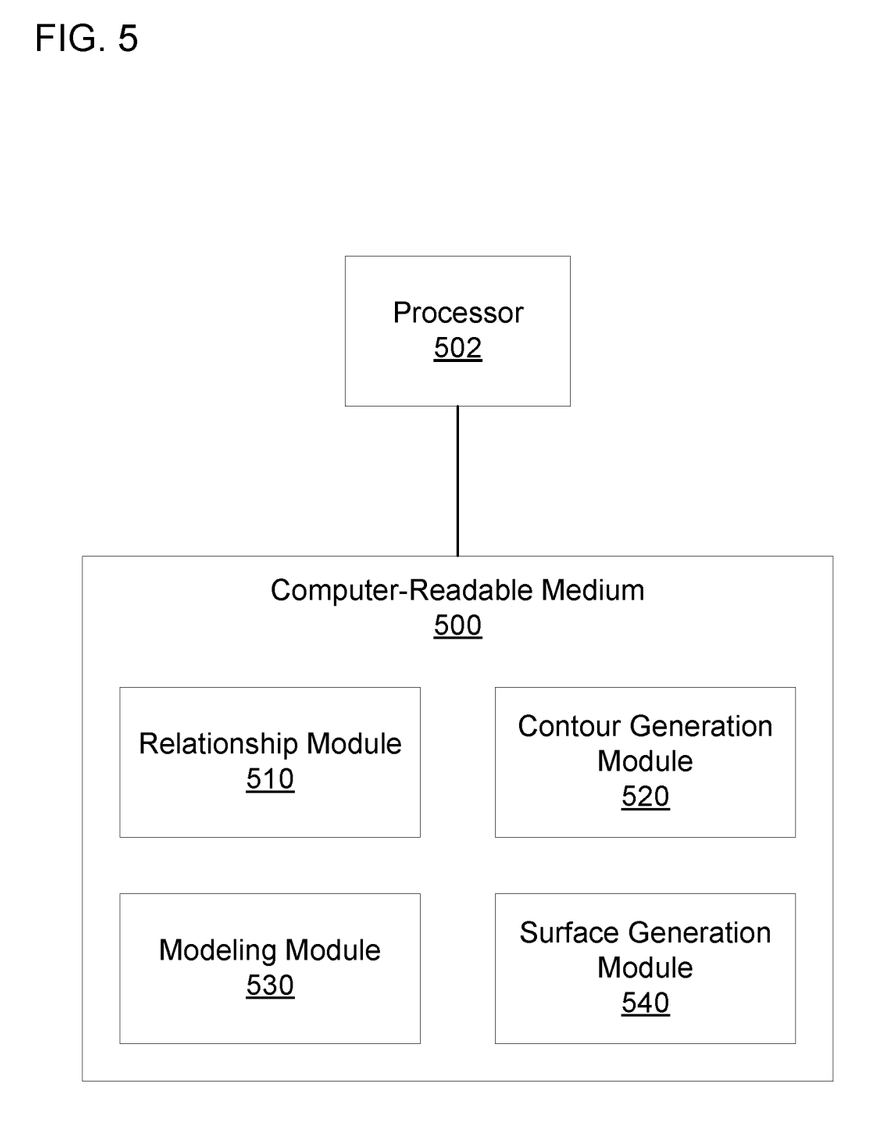
FIG. 5 is a block diagram of an example computer-readable medium including instructions that cause a processor to generate a model of an object from images of the object.

FIG. 5 is a block diagram of an example computer-readable medium 500 including instructions that, when executed by a processor 502, cause the processor 502 to generate a model of an object from images of the object. The computer-readable medium 500 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, a paper storage device, flash memory, read-only memory, non-volatile RAM, etc.), and/or the like. The processor 502 may be a general-purpose processor or special purpose logic, such as a microprocessor (e.g., a central processing unit, a graphics processing unit, etc.), a digital signal processor, a microcontroller, an ASIC, an FPGA, a programmable array logic (PAL), a programmable logic array (PLA), a programmable logic device (PLD), etc.

The computer-readable medium 500 may include a relationship module 510. As used herein, a "module" (in some examples referred to as a "software module") is a set of instructions that when executed or interpreted by a processor or stored at a processor-readable medium realizes a component or performs a method. The relationship module 510 may include instructions that, when executed, cause the processor 502 to determine a spatial relationship between an object in each of a plurality of images and an imaging device used to capture the plurality of images based on a rate of rotation of the object and a timing of image capture. For example, the relationship module 510 may cause the processor 502 to determine rotation of the object in the plurality of images based on a frame of reference of the imaging device or the revolution of the imaging device about the object in the plurality of images based on a frame of reference of the object.

The computer-readable medium 500 may include a contour generation module 520. The contour generation module 520 may cause the processor 502 to generate a plurality of object contours based on the plurality of images. The contour may be generated based on determining a location of the object in each image and determining the location of the edge of the object (e.g., using computer visions techniques, machine learning, etc.). The contour generation module 520 may cause the processor 502 to generate each contour from a corresponding one of the plurality of images. For example, each image may include the object, and the contour generation module 520 may cause the processor 502 to generate a contour based on the object as it appears in that image. In some examples, multiple objects may be modeled based on the plurality of images and there may be multiple pluralities of object contours.

The computer-readable medium 500 may include a modeling module 530. The modeling module 530 may cause the processor 502 to remove a plurality of voxels from a model of the object based on comparing the plurality of voxels to the plurality of object contours according to the spatial relationship for each image. For example, the modeling module 530 may cause the processor 502 to compare a backprojection of the model according to the spatial relationship for an image to the contour for that image to determine which voxels to remove or to compare a projection of the contour according to the spatial relationship for an image to the model to determine which voxels to remove. The modeling module 530 may cause the processor 502 to repeat the comparisons for each image and determine which voxels to remove based on individual images or based on multiple images. The modeling module 530 may cause the processor 502 to remove the identified images.

The computer-readable medium 500 may include a surface generation module 540. The surface generation module 540 may cause the processor 502 to generate a representation of a surface of the object based on the model. For example, the modeling module 530 may cause the processor 502 to remove voxels iteratively. Once the resolution of the model satisfies a threshold, the surface generation module 540 may cause the processor 502 to generate the representation of the surface of the object, for example, so that the representation of the surface can be output. The surface generation module 540 may cause the processor 502 to connect voxel vertices on an external side of the model to generate the representation of the surface. In an example, when executed by the processor 502, the relationship module 510, the contour generation module 520, or the modeling module 530 may realize the comparison engine 140 of FIG. 1, or the modeling module 530 or the surface generation module 540 may realize the modeling engine 150.

Figure 6:
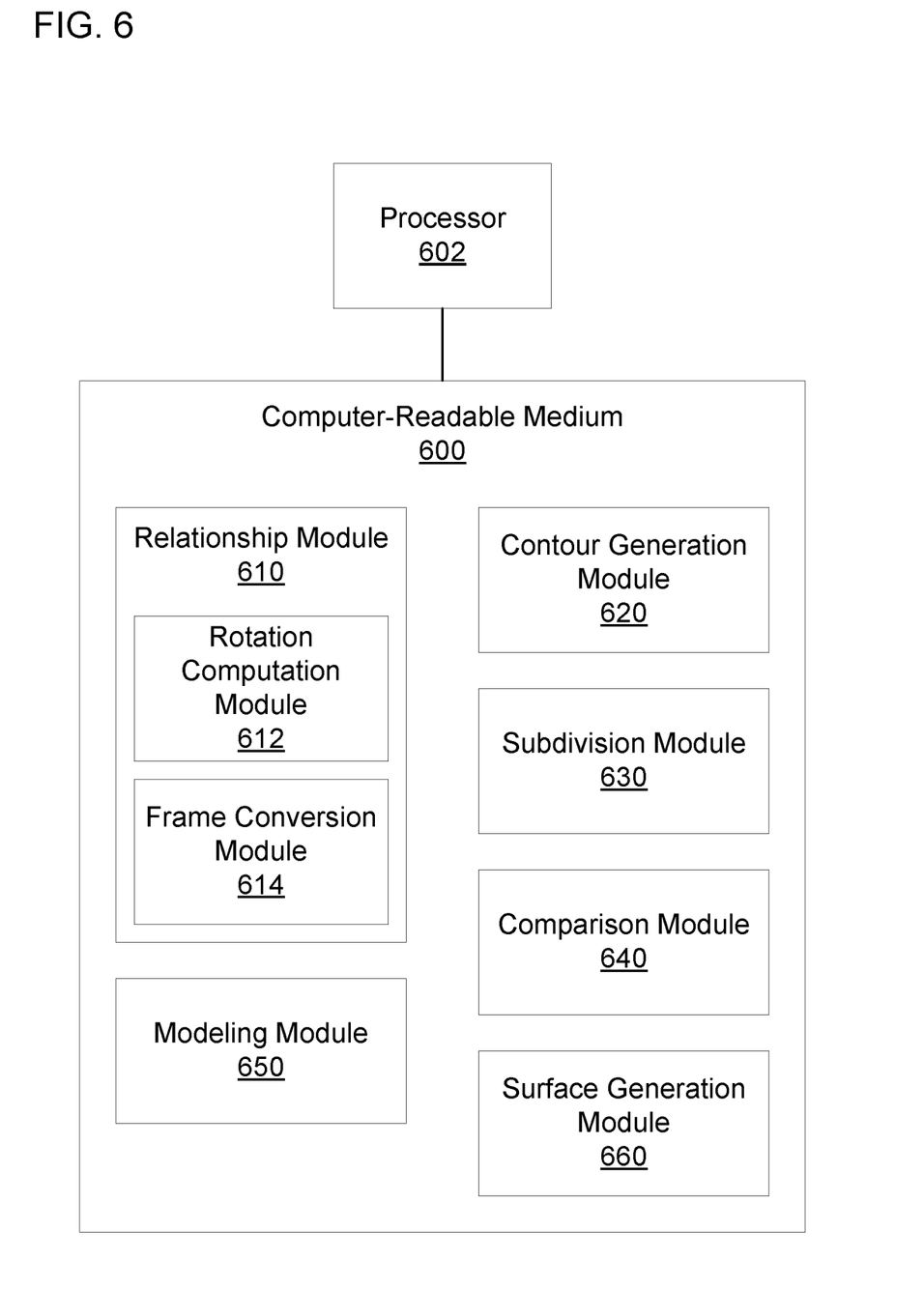
FIG. 6 is a block diagram of another example computer-readable medium including instructions that cause a processor to generate a model of an object from images of the object.

FIG. 6 is a block diagram of another example computer-readable medium 600 including instructions that, when executed by a processor 602, cause the processor 602 to generate a model of an object from images of the object. The computer-readable medium 600 may include a relationship module 610. The relationship module 610 may cause the processor 602 to determine a spatial relationship between an object in each of a plurality of images and an imaging device used to capture the plurality of images based on a rate of rotation of the object and a timing of image capture. The relationship module 610 may include a rotation computation module 612. The rotation computation module 612 may cause the processor 602 to compute the rate of rotation of the object based on a magnitude of a nonrotating, nonuniform electric field used to rotate the object. For example, the computer-readable medium 600 may store the relationship between the voltage or frequency of voltage used to generate the electric field or the magnitude of the electric field and the rate of rotation of the object. The rotation computation module 612 may cause the processor 602 to look up the rate of rotation based on the voltage, the frequency, the magnitude of the electric field, the type of object, the identity of the object, or the like. In some examples, the rotation computation module 612 may calculate the rate of rotation based on electric characteristics of the object, the magnitude of the electric field, the voltage or frequency of the voltage used to generate the electric field, characteristics of the electrodes (e.g., size, shape, position, etc.), or the like.

The relationship module 610 may include a frame conversion module 614. The frame conversion module 614 may cause the processor 602 to convert between a frame of reference of the object and a frame of reference of the imaging device. In an example, the relationship module 610 may cause the processor 602 to determine the spatial relationship by determining the rotation of the object between images from a frame of reference of the imaging device. In an example, the relationship module 610 may cause the processor 602 to determine the spatial relationship by determining the position of the image device from a frame of reference of the object (e.g., an amount of revolution about the object by the imaging device). The frame conversion module 614 may cause the processor 602 to convert movement in one frame of reference to movement in the other frame of reference.

The relationship module 610 may include a contour generation module 620. The contour generation module 620 may cause the processor 602 to generate a plurality of object contours based on the plurality of images. The contour generation module 620 may cause the processor to operate in a similar manner to that caused by the contour generation module 520 of FIG. 5. The computer-readable medium 600 may include a subdivision module 630, a comparison module 640, and a modeling module 650. The subdivision module 630, the comparison module 640, and the modeling module 650 may cooperate to cause the processor 602 to iteratively remove voxels until a desired resolution is reached.

For example, in an iteration, the subdivision module 630 may cause the processor 602 to subdivide voxels into smaller voxels. The comparison module 640 may cause the processor 602 to compare the smaller voxels to contours according to the spatial relationships determined by the relationship module 610 to determine voxels that do not correspond to a boundary of the object. The modeling module 650 may cause the processor 602 to remove voxels from the model based on the comparison by the comparison module 640. In a next iteration, the subdivision module 630 may cause the processor 602 to subdivide the remaining voxels (e.g., those voxels not removed by the modeling module 650) into smaller voxels. The comparison module 640 may cause the processor 602 to compare the subdivided remaining voxels to the contours to determine which of the subdivided remaining voxels do not correspond to the boundary of the object. The modeling module 650 may cause the processor 602 to remove a portion of the subdivided remaining voxels determined by the comparison module 640 not to correspond to the boundary of the object.

The computer-readable medium 600 may include a surface generation module 660. The surface generation module 660 may cause the processor 602 to determine whether a desired resolution has been reached. For example, the surface generation module 660 may cause the processor 602 to compare the size of the voxels resulting from the most recent subdivision to a resolution threshold to determine whether to terminate the iterations. The resolution threshold may be specified by a user, selected by the termination module 660 based on a resolution of an imaging device, or the like. The surface generation module 660 may cause the processor 602 to terminate the iterations when the voxels are smaller than the resolution threshold. In some examples, the surface generation module 660 may cause the processor 602 to generate a representation of a surface of the object based on the model in response to terminating the iterations. The surface generation module 660 may cause the processor 602 to generate the representation of the surface of the object in a manner similar to that of the surface generation module 560 of FIG. 5. Referring to FIG. 2, in an example, when executed by the processor 602, the relationship module 610, the rotation computation module 612, the frame conversion module 614, the contour generation module 620, or the comparison module 640 may realize the comparison engine 240, the subdivision module 630 may realize the subdivision engine 260, the modeling module 650 may realize the modeling engine 250, or the surface generation module 660 may realize the termination engine 270.

The above description is illustrative of various principles and implementations of the present disclosure. Numerous variations and modifications to the examples described herein are envisioned. Accordingly, the scope of the present application should be determined only by the following claims.

What is claimed is:

1. A system comprising:
   a substrate including a plurality of electrodes;
   a controller to apply a voltage to the plurality of electrodes to create an electric field to rotate an object suspended in a fluid;
   an imaging device to capture a plurality of images of the object; and
   a modeling engine to:
      initially form a three-dimensional model of the object as a three-dimensional volume element (voxel) that is larger than the object and does not match the object;
      determine a three-dimensional spatial relationship between the imaging device and the object for each image;
      divide the three-dimensional voxel into smaller three-dimensional voxels; and
      iteratively perform until a size of a smaller three-dimensional voxel of the smaller three-dimensional voxels satisfies a resolution threshold:
         compare a two-dimensional projection of a three-dimensional model of the object to a respective contour of the object in each image, wherein an orientation of the two-dimensional projection corresponds to the three-dimensional spatial relationship between the imaging device and the object, and wherein the object and the three-dimensional model are in a same three-dimensional orientation based on the three-dimensional spatial relationship between the imaging device and the object;
         modify the three-dimensional model of the object to remove one or more smaller three-dimensional voxels from the three-dimensional model of the object corresponding to one or more portions of the two-dimensional projection that are completely outside of the respective contour of the object in each image; and in response to a determination that the size of the smaller three-dimensional voxel does not satisfy the resolution threshold, divide the smaller three-dimensional voxels further into smaller three-dimensional voxels, and replace the smaller three-dimensional voxels of the three-dimensional model remaining after the removal and prior to the division in this iteration with the smaller three-dimensional voxels resulting from the division in this iteration.

2. The system of claim 1, wherein the division of the smaller three-dimensional voxels further into the smaller three-dimensional voxels, comprises:
identify a subset of the smaller three-dimensional voxels remaining after the removal and prior to the division in this iteration corresponding to a boundary of the object, and divide only the subset of the smaller three-dimensional voxels into the three-dimensional smaller voxels.

3. The system of claim 2, wherein the replace the smaller three dimensional voxels of the three-dimensional model remaining after the removal and prior to the division in this iteration with the smaller three-dimensional voxels after the division in this iteration, further comprises:
replace only the subset of the smaller three-dimensional voxels remaining prior to the division in this iteration with the smaller three-dimensional voxels resulting from the division of the subset of the smaller three-dimensional voxels in this iteration.

4. The system of claim 1, further comprising a termination engine to output a final three-dimensional model based on comparing the size of the smaller three-dimensional voxel to the resolution threshold.

5. The system of claim 4, wherein the termination engine is to generate a representation of a surface of the object based on the three-dimensional model.

6. A method, comprising:
capturing, by a system comprising a processor, a plurality of images of a rotating object using an imaging device optically coupled to a microscope;
determining, by the system, a three-dimensional spatial relationship between the imaging device and the rotating object;
initially forming, by the system, a three-dimensional model of the rotating object as a three-dimensional volume element (voxel) that is larger than the rotating object and does not match the rotating object;
dividing, by the system, the three-dimensional voxel into smaller three-dimensional voxels;
iteratively performing until a size of a smaller three-dimensional voxel of the smaller three-dimensional voxels satisfies a resolution threshold:
comparing, by the system, a two-dimensional projection of a three-dimensional model of the object to a respective contour of the object in each image, comprising orienting the three-dimensional model in a same three-dimensional orientation as the rotating object in each image based on the three-dimensional spatial relationship and an amount of rotation of the rotating object between capture of a first image and capture of a second image of the plurality of images;
removing, by the system, one or more smaller three-dimensional voxels from the three-dimensional model of the rotating object corresponding to one or more portions of the two-dimensional projection that are completely outside of the respective contour of the rotating object in each image; and
in response to determining that the size of the smaller three-dimensional voxel does not satisfy the resolution threshold, dividing, by the system, the smaller three-dimensional voxels further into smaller three-dimensional voxels, and replacing, by the system, the smaller three-dimensional voxels of the three-dimensional model remaining after the removal and prior to the division in this iteration with the smaller three-dimensional voxels resulting from the division in this iteration.

7. The method of claim 6, further comprising applying, by the system, a fluid in which the rotating object is suspended to a substrate, and rotating the rotating object by producing a nonrotating, nonuniform electric field using a plurality of electrodes on the substrate.

8. The method of claim 7, further comprising selecting, by the system, a first frame rate of the imaging device based on a first rate of rotation of the rotating object or selecting a magnitude of the nonrotating, nonuniform electric field to cause a second rate of rotation selected based on a second frame rate of the imaging device.

9. The method of claim 7, further comprising measuring, by the system, a rate of rotation of the rotating object and determining the amount of rotation of the rotating object between capture of the first image and capture of the second image based on the rate of rotation.

10. The method of claim 6, further comprising selecting, by the system, a magnification with a depth of field at least substantially a depth of the rotating object.

11. A non-transitory computer-readable medium comprising instructions that, when executed by a processor, cause the processor to:
determine a three-dimensional spatial relationship between an object in each of a plurality of images and an imaging device used to capture the plurality of images based on a rate of rotation of the object and a timing of image capture;
generate respective contours of the object based on the plurality of images;
initially forming a three-dimensional model of the object as a three-dimensional volume element (voxel) that is larger than the object and does not match the object;
dividing the three-dimensional voxel into smaller three-dimensional voxels; and
iteratively performing until a size of a smaller three-dimensional voxel of the smaller three-dimensional voxels satisfies a resolution threshold:
comparing a two-dimensional projection of a three-dimensional model of the object to the respective contours according to the three-dimensional spatial relationship for each image, wherein the object and the three-dimensional model are in a same three-dimensional orientation based on the three-dimensional spatial relationship between the object and the imaging device;
removing one or more smaller three-dimensional voxels from the three-dimensional model of the rotating object corresponding to one or more portions of the two-dimensional projection that are completely outside of the respective contour of the object in each image; and
in response to determining that the size of the smaller three-dimensional voxel does not satisfy the resolution threshold, dividing the smaller three-dimensional voxels further into smaller three-dimensional voxels, and replacing the smaller three-dimensional voxels of the three-dimensional model remaining after the removal and prior to the division in this iteration with the smaller three-dimensional voxels resulting from the division in this iteration; and generate a representation of a surface of the object based on the three-dimensional model.

12. The non-transitory computer-readable medium of claim 11, wherein the dividing of the smaller three-dimensional voxels further into the smaller three-dimensional voxels, comprises:

identifying a subset of the smaller three-dimensional voxels remaining after the removal and prior to the division in this iteration corresponding to a boundary of the object, and dividing only the subset of the smaller three-dimensional voxels into the three-dimensional smaller voxels.

13. The non-transitory computer-readable medium of claim 12, wherein the replacing the smaller three dimensional voxels of the three-dimensional model remaining after the removal and prior to the division in this iteration with the smaller three-dimensional voxels after the division in this iteration, further comprises:

replacing only the subset of the smaller three-dimensional voxels remaining prior to the division in this iteration with the smaller three-dimensional voxels resulting from the division of the subset of the smaller three-dimensional voxels in this iteration.

14. The non-transitory computer-readable medium of claim 11, wherein the instructions cause the processor to compute the rate of rotation based on a magnitude of a nonrotating, nonuniform electric field used to rotate the object.

15. The non-transitory computer-readable medium of claim 11, wherein the instructions cause the processor to determine the three-dimensional spatial relationship by one of determining rotation of the object from a first of the imaging device and determining a position of the imaging device from a second frame of reference of the object.

* * * * *